Sept. 11, 1928.　　　　　　　　　　　　　　　　　　　1,683,779
F. W. HORSTKOTTE
UNLOADING MACHINE
Filed Feb. 10, 1926　　　　4 Sheets-Sheet 1

INVENTOR
Frederick W. Horstkotte
BY Herbert E. Smith
ATTORNEY

Sept. 11, 1928.  F. W. HORSTKOTTE  1,683,779
UNLOADING MACHINE
Filed Feb. 10, 1926     4 Sheets-Sheet 2

Inventor
Frederick W. Horstkotte
by Herbert E. Smith
Attorney

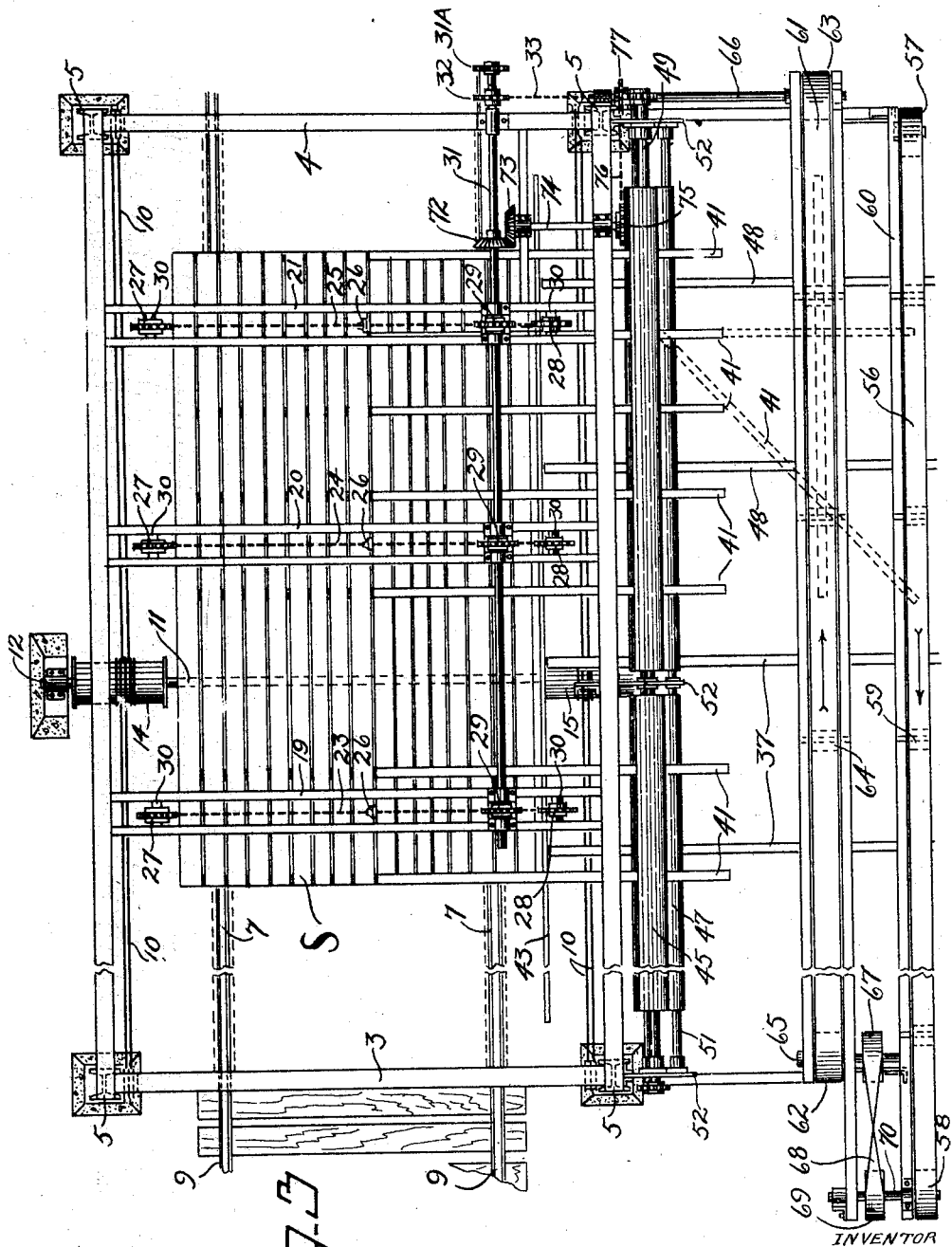

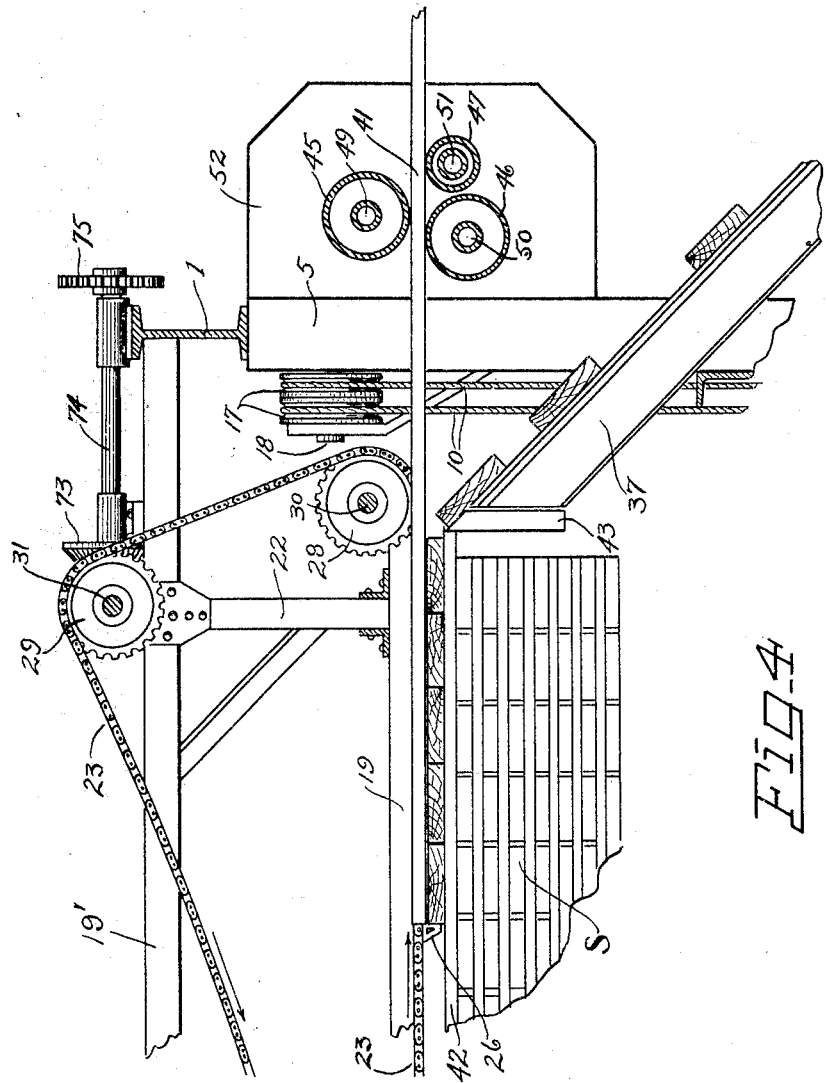

Patented Sept. 11, 1928.

1,683,779

UNITED STATES PATENT OFFICE.

FREDERICK W. HORSTKOTTE, OF PORTLAND, OREGON.

UNLOADING MACHINE.

Application filed February 10, 1926. Serial No. 87,262.

The present invention relates to improvements in unloading machines known in the trade as unstackers. The machine is designed primarily for use in unloading lumber and similar material, as from a kiln truck, and for conveying the successive boards or planks from the stack to a desired destination. The invention as generally stated involves the use of an elevator that is intermittently operated to lift a truck and stack of lumber thereon, after the stacked lumber has been treated as in a kiln. Means are provided for co-action with the elevator in retaining the top layer or course of planks on the stack in its formation as the top layer is being pushed from the stack, and means travelling transversely of the stack are provided for pushing a layer from the stack as the layers are successively presented for this purpose.

In the formation of a stack of lumber on the truck preparatory to treatment in the kiln, spacers or sticks are arranged transversely of the stack between layers of planks, to provide spaces for ventilation. After the truck load or stack of lumber has been treated in the kiln, and in connection with the removal by layers of the lumber from the stack, these sticks are also automatically removed and gathered for future use.

While I have illustrated and described the invention as specifically applied to the work of unloading a stack of lumber, it will be understood that the drawings show merely one exemplification of the invention, and that the machine is capable of other adaptations and uses.

The invention consists in certain novel combinations and arrangements of parts for carrying out the hereinbefore stated objects of my invention as will hereinafter be more fully pointed out and claimed.

In the accompanying drawings I have illustrated one complete example of the physical embodiment of my invention wherein the parts are combined and arranged according to the best mode I have thus far devised for the practical application of the principles of my invention.

Figure 3 is a top plan view of the machine.

Figure 4 is an enlarged detail view showing the construction and operation of the discharging or delivery mechanism a layer or course of lumber from the stack, and also showing the discharging or delivering mechanism for the sticks or spacers built into the stack of lumber on the truck.

Figure 1:
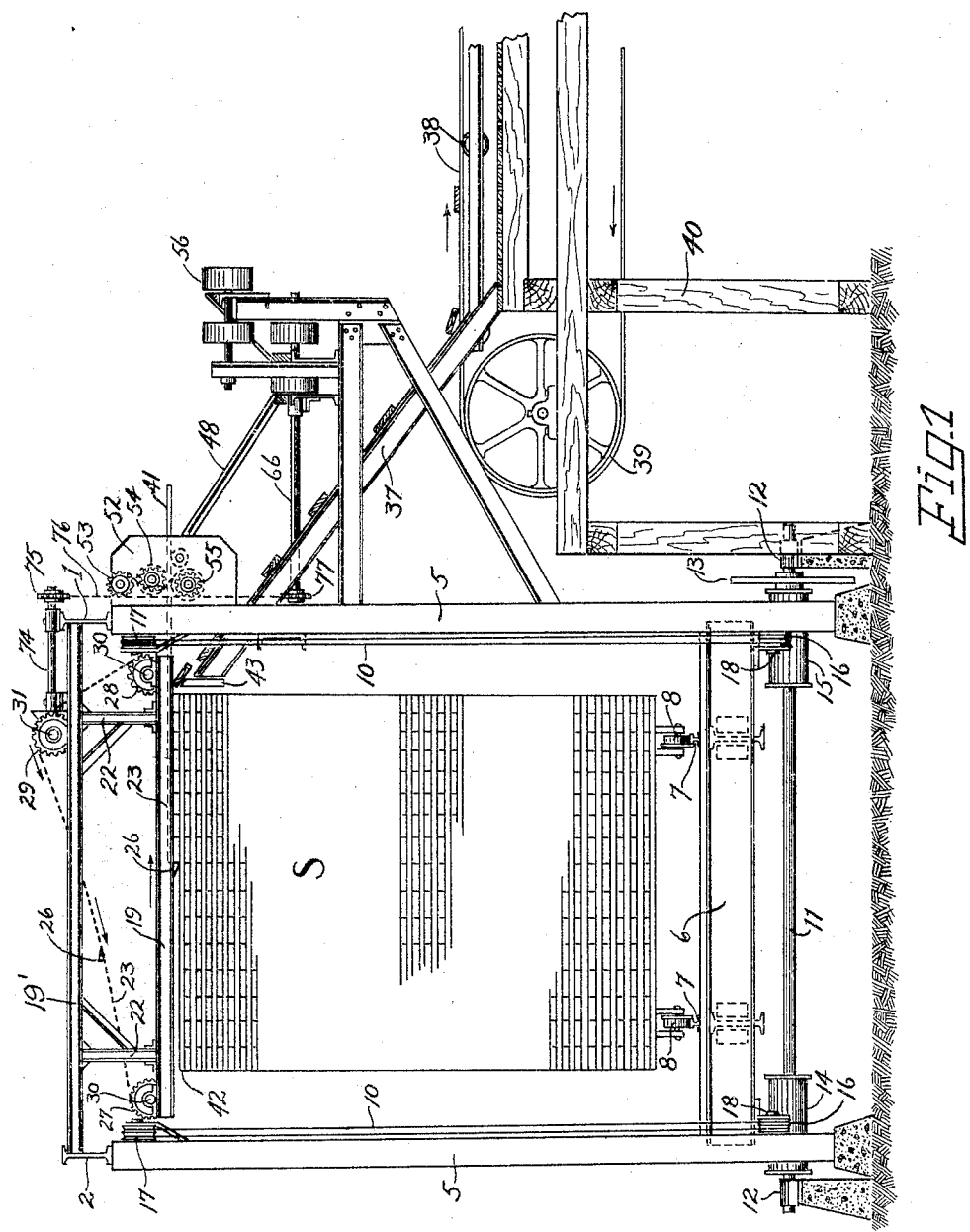
Figure 1 is an end elevation of the machine showing a kiln truck and stack of lumber thereon, and the machine in operative position to unload and deliver the material from the stack.

In carrying out my invention I employ an open supporting structure or rectangular frame including a pair of I-beams as 1 and 2 at the front and rear of the machine, and end beams 3 and 4, which rectangular frame is properly braced and tied and supported on the four corner posts or columns 5.

Within the supporting structure is located a horizontally disposed elevator or vertically movable platform 6 with rails or tracks 7 thereon upon which the wheels of the truck 8 may be run from the rails or track 9 which extend from each end of the supporting structure for communication with a kiln or other appliance. The lumber, boards, or planks are piled in a stack S on the truck and the material treated in the kiln and then the truck load is run upon the rails of the elevator in the position indicated in the drawings, from which stack the material is discharged in successive layers.

The successive layers are discharged from the top of stack and the truck supporting the stack is intermittently elevated to present the successive layers in position to be discharged.

At the four corners of the supporting structure are provided suspending cables 10 for the elevator and the movement of the elevator is controlled from the shaft 11 journaled in bearings 12 and operated by a drive gear 13. Power may be applied to the gear wheel 13 from suitable source and required clutch mechanism is used for regulating and controlling the operations of the elevator.

The drive shaft 11 is provided with a pair of spaced drums 14 and 15 for the cables, and the cables pass around the four lower guide pulleys 16 and four overhead pulleys 17 which are carried by shafts 18 journaled in brackets on the main frame of the supporting structure.

As the stack is intermittently elevated by upward movement of the elevator and truck the top layer or course of planks encounters an abutment which comprises three spaced and transversely extending horizontal beams 19, 20 and 21 each made up of a pair of spaced metal plates of suitable formation, and supported from above by means of vertically extending hangers or suspending brackets 22 projected downwardly from the overhead beams 19′, 20′ and 21′ arranged parallel with the respective abutment beams 19, 20, and 21. The brackets 22 are adapted to slide vertically between ways secured to the beams 19, 20 and 21 in order that the skids may adjust themselves to the contour of the top of the load or stack. The top beams 19′, 20′ and 21′ are riveted or bolted at their ends to the front beams 1 and 2 of the supporting structure and the upper and lower sets of beams with their connecting hangers or brackets form a rigid frame extending transversely of the supporting structure and across the top portion thereof.

As shown in the drawings the top layer or course of the stack is lifted against this abutment and the layer is retained with sufficient friction between the stack and the abutment to hold the layer in its formation while the layer is being pushed or discharged transversely of the stack. The boards or planks of the discharging layer drop successively from the top of the stack.

For the purpose of discharging the layers successively from the stack I employ a series of spaced endless conveyers or chains as 23, 24, and 25 each having properly spaced pushing or discharging lugs 26 which travel at predetermined intervals across the top of the stack with their working flights guided between the spaced bars or plates of the three abutments 19, 20 and 21.

These endless conveyer chains pass over two sets of lower sprocket wheels 27 and 28 to form the working flights of the chains and thence over a guide sprocket 29. The lower sprocket wheels have shafts 30 journaled on the abutments, and the driving sprocket wheel 29 for each chain revolves with an operating shaft 31 extending longitudinally of the machine and journaled in bearings on the top beams 19′, 20′ and 21′ of the abutment frame.

The operating shaft 31 projects over one end of the main frame and upon its end has a sprocket wheel 32 and chain 33 passes over a driving sprocket 34 on the drive shaft 49. The shaft 31 may receive power from a suitable source for operating the machine as by gears 31ᵃ thereon.

The boards of the top layer are pushed or discharged to the right in Figures 1 and 4 and fall successively upon an inclined chute 37, and as they slide down this chute by gravity the successive planks or boards are picked up and conveyed by a suitable endless conveyer 38 to their destination.

In the erection of the stack on the truck previous to treatment of the material in the kiln, sticks 41 are laid on the layers or courses transversely of the stack and spaced a suitable distance apart to form spaces for ventilation of the stack. These sticks are separated from the lumber during the discharging operation of the layers, and the sticks are gathered and conveyed to a suitable place of delivery for future use.

The sticks 41 on the top of the top layer of planks are discharged, but the sticks designated as 42 located beneath the top layer of the stack in Figure 4 are retained while the top layer is being discharged.

For this purpose an abutment or board 43 which extends longitudinally of the machine is attached to a suitable support, as the frame 37, and located in position to permit free movement of the top layer or boards, but retain the sticks 42 when their ends encounter the abutment.

The friction between the underside of the top layer and the sticks 42 is usually sufficient to start the sticks 42 to move toward the right in Figures 1 and 4, but the abutment 43 prevents material movement of these sticks 42. The sticks 41 however on top of the top layer that is being moved or discharged, are carried with the layer as it moves to the right under action of the discharge chains 23, 24 and 25. The boards or planks as they reach the abutment fall by gravity down the slide 37 from under the sticks, the remaining part of the layer or course continuing to carry the sticks until they are engaged by the rolls 45, 46 and 47.

As the sticks 41 are conveyed to the right by the discharging layer upon which they rest, their forward ends are projected beyond the supporting structure and these ends are grasped between sets of delivery rollers 45, 46 and 47, which pull and guide the sticks between them and deliver the sticks into a trough 48, which trough extends longitudinally at the front of the supporting structure and is located above the chute 37 for the discharged lumber.

The rollers 45, 46 and 47 are carried on the respective shafts 49, 50 and 51 which are journaled in bearing plates 52 projecting laterally from the front of the supporting structure.

Figure 2:
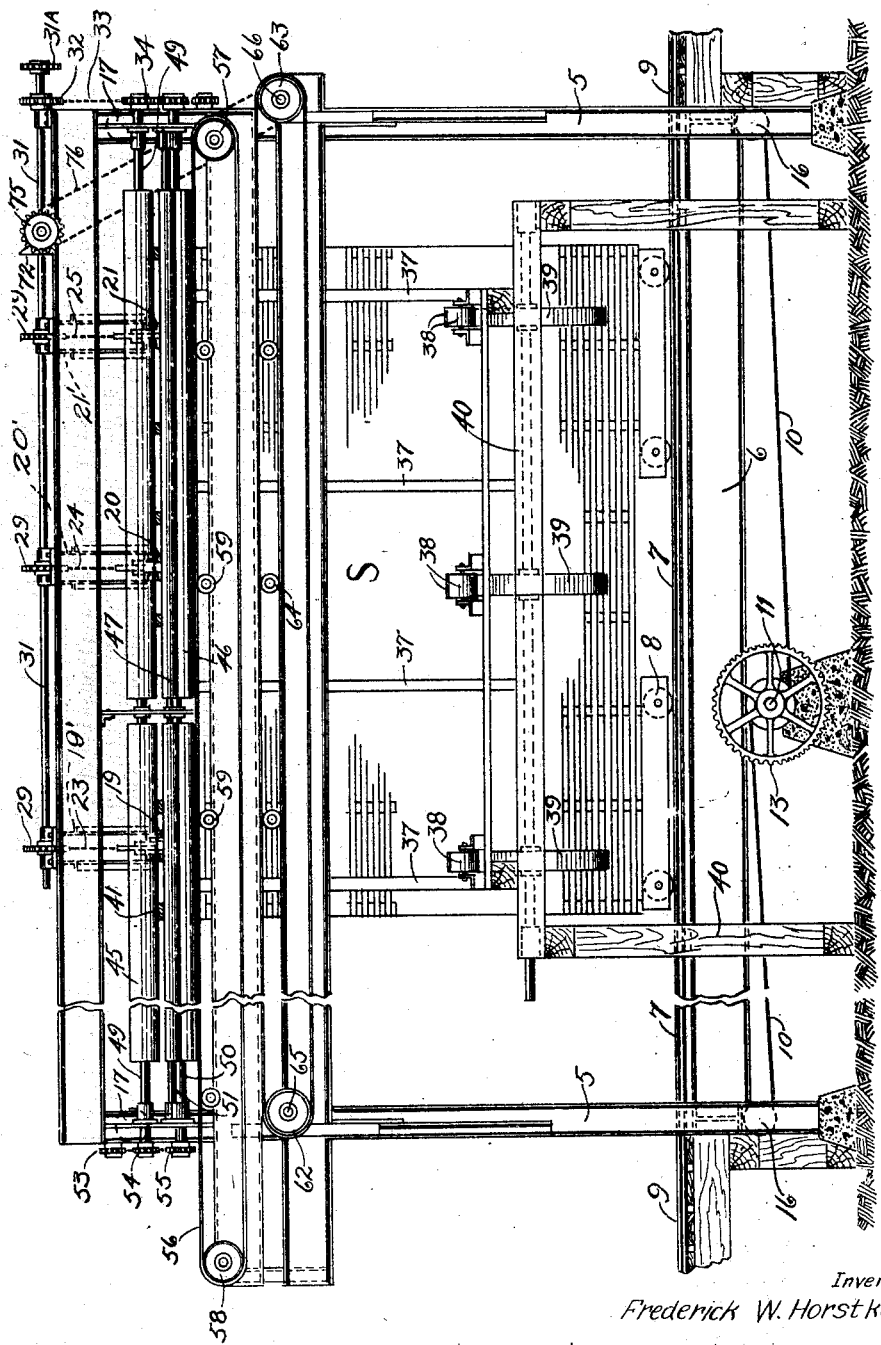
Figure 2 is a view in front elevation of the machine as seen from the right in Figure 1.

The roller 45 revolves anticlockwise and the rollers 46 and 47 revolve clockwise to draw the sticks, and this difference in direction of rotation of the rollers is provided for by means of gears 53, 54 and 55 shown at the left in Figure 2.

The roller shafts are driven from the operating shaft 31 through the sprocket 32, chain 33 and sprocket 34 on the shaft 49.

The sticks 41 enter and pass between the rollers lengthwise, and after passing from the rollers the sticks are turned through an arc of 90 degrees and then conveyed lengthwise, away from in front of the machine and deposited or gathered in suitable manner.

As the sticks are turned they slide by gravity, down the trough or ways 48 after emerging from the rollers that grasp and guide them.

The sticks are conveyed by an endless belt 56 which extends longitudinally of the machine and is located at a suitable distance from the front thereof and a little below the top of the stack.

The endless conveyer belt is supported and operated on two spaced pulleys 57 and 58, and moves with the upper or working flight travelling to the left as indicated by the arrows in Figure 3. This belt, which is adapted to turn or swing the sticks from a position transverse to the stack to a position parallel with the longitudinal axis of the machine, is supported and guided on the auxiliary rollers 59 supported in the frame 60.

As shown by dotted lines in Figure 3 the forward end of the stick reaches a point above the turning belt before the stick is free of the supporting rollers and the stick then falls and rests upon the turning belt. As soon as the stick is free of its supporting rollers the moving belt swings the front end of the stick to permit the latter to fall and be guided on its fall by the trough to the position shown in full lines, on a conveyer belt 61 located at the bottom of the trough.

This conveyer belt 61 is parallel with the turning belt 56, but its working or upper flight travels in the opposite direction to that of the belt 56, that is, to the right in Figure 3, in order that the sticks may be delivered at the right of the machine.

The conveyer belt is supported at its ends on pulleys 62 and 63, and by intermediate guide rollers 64 spaced a suitable distance apart. The pulleys 62 and 63 are carried by shafts 65 and 66 respectively, the latter shaft being a drive shaft for the conveyer.

In Figure 3 it will be seen that the shaft 65 transmits power to the belt 59 through pulley 67, twisted or reversed belt 68 and pulley 69 on the shaft 70, to the pulley 58.

The shaft 66 for operating the stick-conveyer is driven from the operating shaft 31 by means of the two bevel gears 72 and 73, the latter on a gear shaft 74 disposed at right angles to shaft 31 and journaled at the front of the machine in suitable bearings. By means of a sprocket wheel indicated at 75 on the shaft 74, chain 76, and sprocket 77 on the shaft 66 this latter shaft is rotated.

It will be understood that the elevating and discharging mechanism are co-ordinated so that the lifting of the stack is automatic and intermittent and the movement of the transversely extending discharging chains and their pawls is synchronous with the movement of the elevator.

As the stack is depleted it is automatically elevated and stopped with the truck and supporting elevator-platform, thus always maintaining the uppermost layer or top layer of planks against the abutments 19 20 and 21, it being understood of course that the abutments are for the purpose of guiding the discharging stack and therefore the abutments are not subjected to strain from the upwardly pressed stack.

When the stack has been shoved in successive layers to discharge the successive planks or boards at the front of the machine, the empty truck is moved off the elevator after the latter has been lowered to normal position, and a loaded truck is moved forward to take its place on the elevator.

In this manner the loaded truck is quickly and with facility unloaded or unstacked, and the planks are uniformly discharged to their longitudinally extending conveyer from which they may be handled with facility and convenience. At the same time the sticks are recovered and gathered for subsequent use and are in position for handling them with minimum amount of labor.

The speed of the machine may be varied to suit different conditions, and the discharging chains may be adjusted to suit different widths of stacks. Different lengths of lumber may be handled within the limits of the dimensions of the machine, and of course the machine may be constructed in desired size to handle a maximum length of lumber or planks.

Various other changes and alterations may be made in the exemplified structure, without in the scope of my appended claims without departing from the principles of my invention.

Having thus fully described my invention what I claim as new and desire to secure by Letters Patent is—

1. In an unstacker the combination with discharging means adapted to bodily move a top layer of the stack, means for preventing movement of spacing sticks below said layer, and means for removing spacing sticks from above the layer.

2. In an unstacker the combination with a vertically movable platform for supporting a stack and discharging means adapted to bodily move a top layer of the stack and spacing sticks above said layer, means for preventing movement of spacing sticks below the top layer, and means for removing the spacing sticks above said layer.

3. In an unstacker the combination with transversely movable discharging means adapted to bodily move a top layer from the stack, an abutment in the path of movement of spacing sticks beneath said layer, and means for removing the spacing sticks carried on the top of said layer.

4. In an unstacker the combination with means for removing sticks from the stack, of means for turning said sticks, a trough for receiving the turned sticks and a conveyer co-acting with said trough for the purpose described.

5. In an unstacker the combination with a series of delivery rollers adapted to withdraw sticks from a stack, of a transversely moving belt for receiving the free ends of the sticks from said rolls and turning the sticks, and a conveyer adapted to receive and deliver said turned sticks.

6. In an unstacker, a main frame, a platform arranged for vertical movement therein and adapted to support a stack, a supplemental frame over the top of said main frame, spaced horizontal bars in said supplemental frame for limiting upward movement of a stack on said platform, and conveyor means in said supplemental frame for removing from the top of a stack a layer abutted against said bars, said bars forming guides for said conveyor means across the top of a stack.

In testimony whereof I affix my signature.

FREDERICK W. HORSTKOTTE.